United States Patent

Ishiguro

[11] Patent Number: 6,029,015
[45] Date of Patent: Feb. 22, 2000

[54] CAMERA WITH BUILT-IN ELECTRONIC FLASH

[75] Inventor: Minoru Ishiguro, Omiya, Japan

[73] Assignee: Fuji Photo Optical Co., Ltd., Saitama-ken, Japan

[21] Appl. No.: 08/842,507

[22] Filed: Apr. 24, 1997

Related U.S. Application Data

[63] Continuation of application No. 08/546,268, Oct. 20, 1995, abandoned.

[30] Foreign Application Priority Data

Oct. 20, 1994 [JP] Japan ................................ 6-255599

[51] Int. Cl.[7] .............................. G03B 13/36; G03B 7/16
[52] U.S. Cl. ............................ 396/187; 396/61; 396/164
[58] Field of Search ............................. 396/61, 164, 187

[56] References Cited

U.S. PATENT DOCUMENTS

| | | | |
|---|---|---|---|
| 3,478,660 | 11/1969 | Land | 354/414 |
| 4,192,587 | 3/1980 | LaRocque et al. | 354/414 |
| 4,288,153 | 9/1981 | Johnson | 354/414 |
| 4,331,400 | 5/1982 | Brownstein et al. | 354/414 |
| 4,375,322 | 3/1983 | Coppa et al. | 354/414 |
| 4,724,455 | 2/1988 | Suzuki et al. | 396/187 |
| 4,801,964 | 1/1989 | Desormeaux | 354/414 |
| 5,017,955 | 5/1991 | Kotani | 396/187 |
| 5,121,155 | 6/1992 | O'Such et al. | 354/414 |
| 5,335,041 | 8/1994 | Fox | 354/419 |
| 5,343,268 | 8/1994 | Takahashi | 354/419 |
| 5,384,616 | 1/1995 | Wilson et al. | 354/414 |

FOREIGN PATENT DOCUMENTS

57-54777  11/1982  Japan .

*Primary Examiner*—David M. Gray
*Assistant Examiner*—Michael Dalakis
*Attorney, Agent, or Firm*—Young & Thompson

[57] ABSTRACT

An ever-flash exposure control system for a built-in flash camera controls a shutter to open and close so as to provide a standard exposure for scene brightness which are higher than standard scene brightness for which the shutter provides a full aperture to complete the standard exposure and triggers an electronic flash to provide illumination light at a time at which the shutter reaches an aperture according to a subject distance during exposure.

6 Claims, 10 Drawing Sheets

FIG. 5

| | | | | |
|---|---|---|---|---|
| B3(Bv=8) | OFS = 1/8 (-3EV) | OFS = 1/4 (-2EV) | OFS = 1/2 (-2EV) | OFS = 0 (OFF) |
| | OFS = 1/4 (-2EV) | OFS = 1/4 (-2EV) | OFS = 1/2 (-2EV) | OFS = 0 (OFF) |
| B2(Bv=6) | OFS = 1/2 (-1EV) | OFS = 1/2 (-1EV) | OFS = 1 (0EV) | OFS = 1 (0EV) |
| B1(Bv=3.5) | OFS = 1 (0EV) | OFS = 1 (0EV) | OFS = 1 (0EV) | OFS = 1 (0EV) |
| | NEAR | D1 (1.3 m) | D2 (3 m) | D3 (8.9 m) |

SCENE BRIGHTNESS (vertical axis)

SUBJECT DISTANCE (horizontal axis)

CAMERA WITH BUILT-IN ELECTRONIC FLASH

This application is a continuation of application Ser. No. 08/546,268, filed Oct. 20, 1995, now abandoned.

BACKGROUND OF THE INVENTION

1. Field of the Invention

The present invention relates to a camera with a built-in electronic flash or strobe which effects flash exposure control even during the daytime.

2. Description of Related Art

Outdoors, it often happens in taking portraits that backlight and the direct sun right above over the subject create harsh shadows on the subject, in particular, on the subject's face. In order to prevent harsh shadows on the subject in such a backlit situation, it is helpful to utilize what is called an ever-flash exposure technique in which a built-in electronic flash is fired for every exposure even during the daytime. Because of extensive latitude of exposure, the ever-flash exposure is beneficially used with negative color films. However, if flash illumination is simply provided during flashmatic exposure in which the electronic flash is fired at apertures corresponding to subject distances to give proper exposures determined based on the intensity of ambient scene light or the brightness of scene, pictures display too enhanced contrast between a subject image and a background which gives a dull impression.

One such ever-flash exposure control camera is that described in Japanese Laid-Open Patent No. 56 - 149,022. The approach used is to control the amount of flash light directed to the subject according to scene brightness which is detected by a photo-electric sensor. For the purpose of providing a brief description about the prior art ever-flash exposure control that will enhance an understanding of the present invention, reference is made to FIG. 10.

As shown in FIG. 10, when there is no ambient scene light contributory to exposure, the ever-flash exposure control system energizes the electronic flash to provide flash illumination light which bears a proportion, namely a contribution ratio, of 100% relative to the quantity of light necessary to proper film exposure. With an increase in the quantity of ambient scene light until the proper film exposure is attributable 70% to the ambient scene light, the ever-flash exposure control system provides the quantity of flash illumination light forming the remaining portion of the quantity of light necessary for the proper film exposure which is changeable in exposure contribution ratio to 30% so as to give 100% of the quantity of light necessary for the proper film exposure. Together, when the quantity of ambient scene light further increases, the ever-flash exposure control system automatically regulates an aperture of the shutter so as to sustain only 70% of the quantity of ambient scene contributory to the proper film exposure. Accordingly, the exposure contribution ratio of the total quantity of ambient scene light and flash illumination light is always 100% of the quantity of light necessary for the proper film exposure over the entire range of potential scene brightness.

However, since the prior art ever-flash exposure control system provides the quantity of flash illumination light of at least 30% of the quantity of light necessary for proper film exposure even in a range of relatively high scene brightness, the brightness of an subject is enhanced, resulting in a decline of the quantitative ratio of light from the subject relative to light from the background. In such an event, there is provided a picture with a dull background which always spoils photographic pleasure. Further, since the prior art ever-flash exposure control system provides the quantity of flash illumination light forming a proportion of at least 30% of the quantity of light necessary for proper film exposure regardless of subject distances, in close up shots in which a subject fills most of the frame, the brightness of the subject is enhanced. In such case, there is provided a picture with an image of the subject standing out in bold relief against a dark background which always gives an odd feeling.

SUMMARY OF THE INVENTION

It is an object of the present invention to provide a camera with a built-in electronic flash which is controlled to provide the quantity of flash illumination light so as to always effect optimum film exposure.

The foregoing object of the present invention is achieved by providing a flashmatic camera equipped with an ever-flash exposure control system. The flashmatic camera includes a shutter which opens and closes so as to effect standard exposure for a scene whose brightness is higher than predetermined standard scene brightness for which the shutter opens to and holds a full size of opening for a specific time to make the standard exposure and an electronic flash which is triggered to provide a rated peak duration of flash illumination light at a time at which the shutter reaches sizes of opening according to subject distances during exposure. The ever-flash exposure control system further changes the time of triggering the electronic flash according to predetermined ranges of subject distances so that the rated peak duration of flash illumination light is appropriate in quantity for providing the standard exposure when scene brightness are lower than the standard scene brightness and so as to reduce a quantitative proportion of the rated peak duration of flash illumination light contributory to exposure stepwise with an increase in scene brightness when scene brightness are higher than the standard scene brightness. A ratio of the reduction of the quantitative proportion of the rated peak duration of flash illumination light contributory to the proper exposure may be increased with a reduction in the subject distance.

When the brightness of a scene in which a subject stands is lower than the standard scene brightness, the electronic flash is triggered at a time so that the flash illumination light contributes 100% to the standard exposure. The triggering time is controlled to become shorter according to changes in subject distance, preventing overexposure in close up shots. Further, even in such an event where the scene brightness is lower than the standard scene brightness and, consequently, the quantity of scene ambient light is insufficient for a proper exposure, the electronic flash provides a sufficient quantity of flash illumination light for the standard exposure, enabling to make a proper exposure.

On the other hand, when the brightness of a scene in which a subject stands is higher than the standard scene brightness, the electronic flash is triggered at a time so that the flash illumination light decreasingly contributes to the standard exposure with an increase in scene brightness. The ratio of the reduction of the quantitative proportion of flash illumination light contributory to exposure is increased with a reduction in the subject distance.

Even when the scene brightness is higher than the standard scene brightness and, consequently, the ambient scene light is sufficient in quantity for a proper exposure, the electronic flash is caused to provide illumination light toward the subject so as to prevent harsh shadows on the subject which is in backlit and/or the direct sun situations.

Further, the triggering time of the electronic flash is controlled so that the contribution ratio of flash illumination light to the standard exposure is reduced stepwise with increases in scene brightness, there is not caused a decline in the scene brightness relative to the brightness of the subject, so as to yield a balanced distribution of brightness over the bright scene to be photographed, thereby preventing a picture with a dull background.

Because the ratio of the reduction of the quantitative proportion of flash illumination light contributory to a proper exposure is increased with a reduction in the subject distance, there is not caused an unbalanced distribution of brightness over the scene to be photographed even in close up shots where a subject fills most of the frame. This prevents a picture from including the subject standing out in bold relief against a background.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIG. 5 is a diagram showing a flash output regulation table;

DETAILED DESCRIPTION OF THE PREFERRED EMBODIMENTS

A camera equipped with a built-in electronic flash, which is hereafter referred simply to as a built-in flash camera, according to a preferred embodiment of the present invention is shown such as of the type of a 35 mm still picture. Because such cameras are well known, this description will be directed in particular to elements forming part of or cooperating directly with apparatus embodying the present invention. It is to be understood, however, that camera elements not specifically shown or described may take various forms well known to those skilled in the art.

Figure 1:
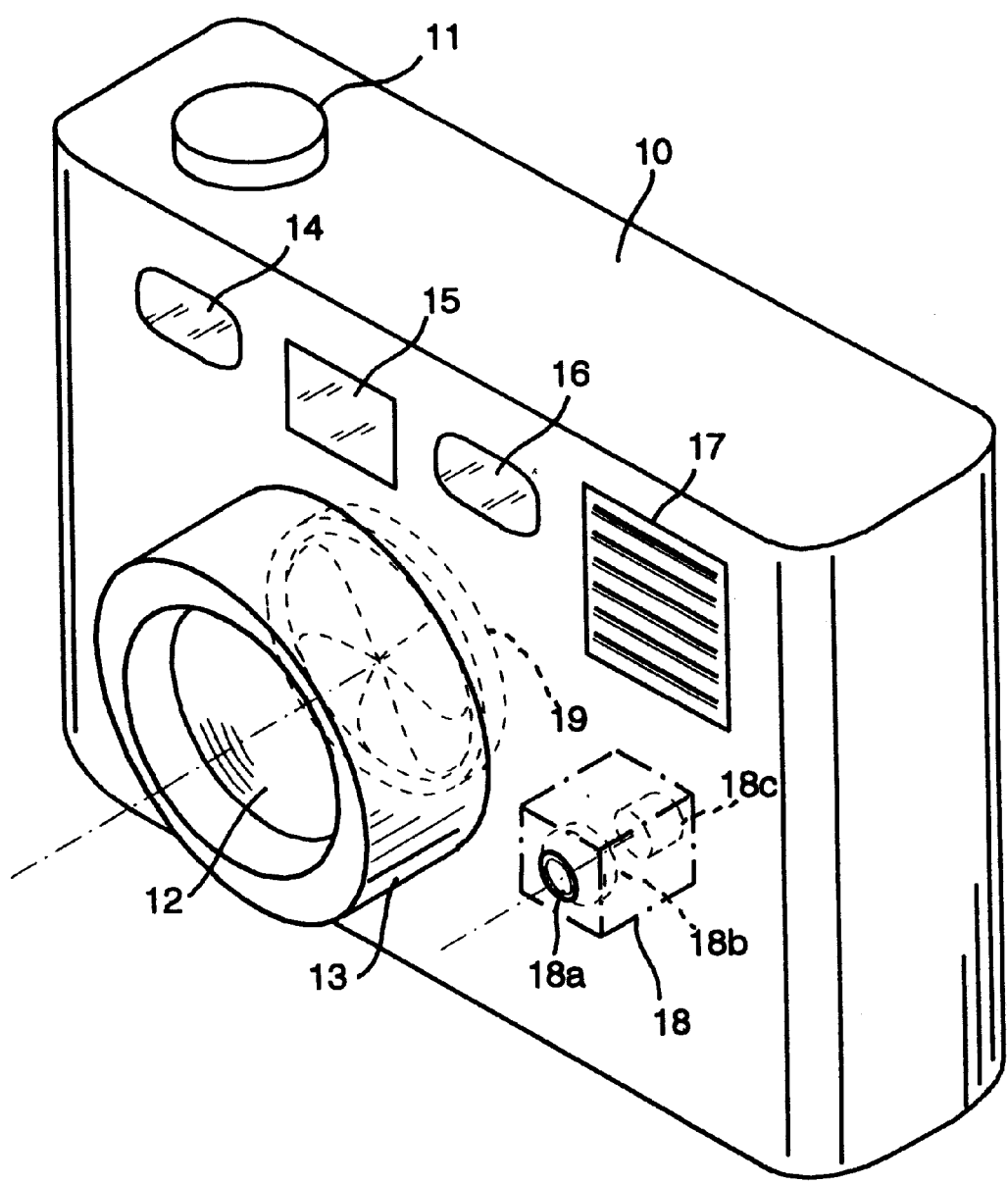
FIG. 1 is a perspective view of a built-in flash camera in accordance with a preferred embodiment of the present invention.

Referring now to the drawings in detail, and in particular, to FIG. 1, a built-in flash camera has a rectangularly-shaped body or housing 10. The camera housing 10 is provided with a manually operated shutter release switch 11 disposed in the top wall thereof and a lens barrel 13, incorporating a taking lens system 12 therein, attached to the front wall thereof. This shutter release switch 11 is of the type which is depressed halfway for bringing the built-in flash camera into readiness for exposure and subsequently fully for effecting the exposure and provides electric signals at these half and full strokes of depression, respectively. The camera housing 10 has various light windows 14, 15 and 16, disposed in a substantially horizontal straight line in the front wall above the taking lens barrel 13 and an electronic flash 17 which is schematically shown by a transparent diffusion plate. An active triangulation type of range finding or automatic focusing system incorporated within the camera housing 10 directs a light beam toward a subject in the scene through the window 14 and receives a light beam reflected by the subject through the window 16 so as to find a distance from the camera to the subject (which is hereafter referred to as a subject distance for simplicity). The window 15 forms a part of a view finder (not shown). If the built-in flash camera has an automatic focusing system, the lens system 12 is automatically focused on the subject when the shutter release switch 11 is depressed halfway. The range finding or automatic focusing system may take any passive type well known to those in skilled in the art.

The built-in flash camera further has a photometric device 18, disposed inside the camera housing 10, for detecting the brightness of a subject in a scene. This photometric device 18 comprises a light window 18a disposed beside and in close vicinity to the lens barrel 13, a lens 18b disposed behind the light window 18a and a photo-electric element 18b disposed behind the light window 18a. The photo-electric element 18b has a light receiving surface offset in a direction of the axis of the lens 18b with respect to an image plane 18c on which the lens 18b forms an image so as to detect the average intensity of ambient scene light or average scene brightness rather than the intensity of light directly reflected from the subject, i.e. the brightness of the subject.

An exposure control system, which will be described in detail later, automatically controls both the size or area of aperture of a shutter 19 provided between the taking lens system 12 and the image plane within the camera housing 10 and a timing at which the electronic flash 17 is triggered so as to make exposure according to the intensity of ambient scene light or scene brightness. In this instance, the shutter 19 is programmed so as to open to a maximum size of aperture with the passage of time and close after having held the maximum size of aperture for a predetermined period of time when the scene brightness is higher than a predetermined brightness. On the other hand, when the scene brightness is less than the predetermined brightness, the shutter 19 closes at a time as soon as it provides apertures predetermined according to subject distances. Together, the electronic flash 17 provides a relatively long peak duration of illumination light.

Figure 2:
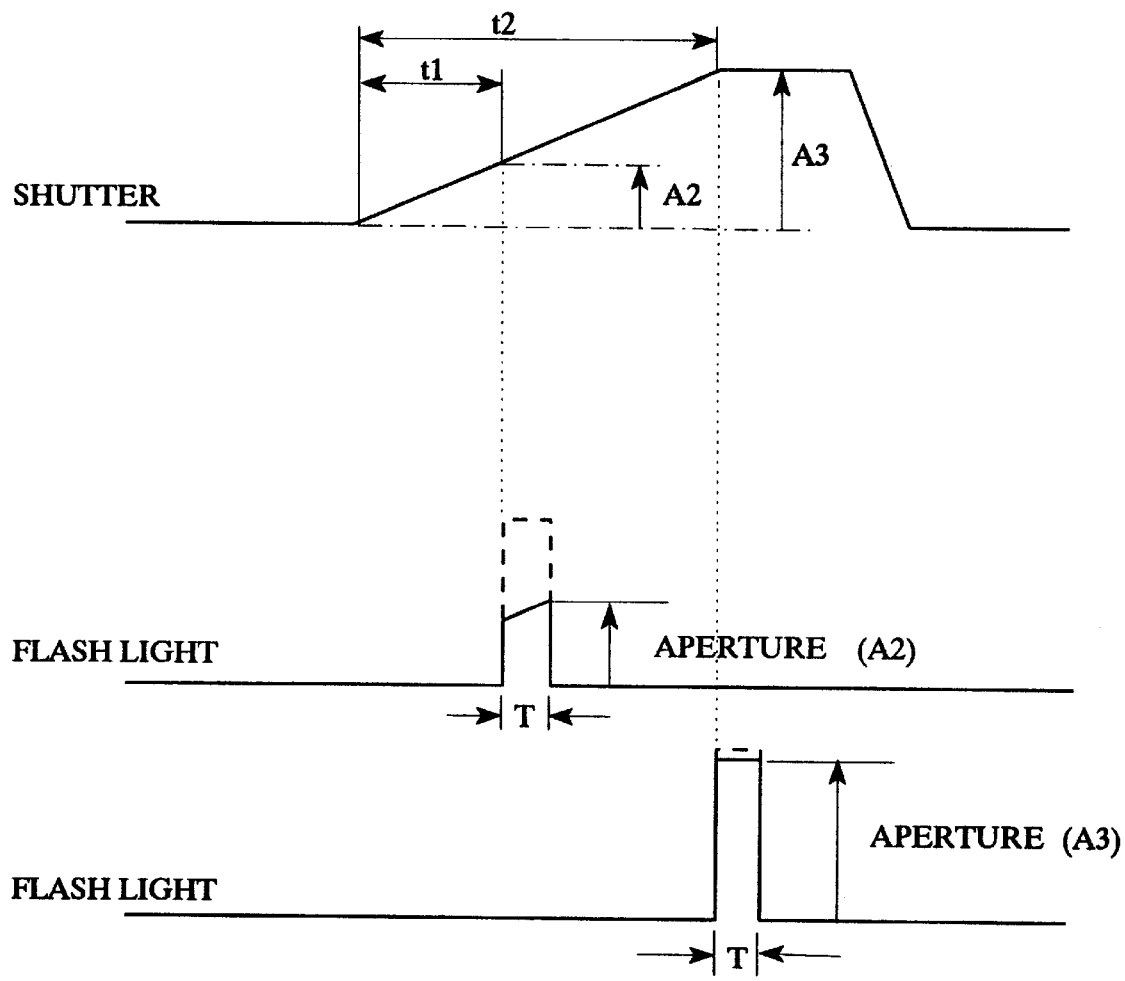
FIG. 2 is a time chart showing a relationship between shutter opening and electronic flash triggering.

The built-in flash camera of this invention regulates an exposure by finely shifting a timing of triggering the electronic flash 17 relative to the commencement of opening the shutter 19. Briefly stated, as shown in FIG. 2, when the electronic flash 17 is triggered to provide flash light at a time t1 from the commencement of opening of the shutter 19 but before the full aperture A3, the shutter 19 permits a quantity of light proportional to the size of aperture A2 to pass therethrough toward the film plane. However, when the electronic flash 17 is triggered at any time after a time t2 at which the shutter 19 reaches the full aperture A3, the shutter 19 permits the same quantity of flash light to pass therethrough in spite of the passage of time. In this instance, the quantity of illumination light that the electronic flash 17 provides at the time t2 is approximately twice as much as that at the time t1, despite the fact that the duration T of the flash remains constant. In this manner, the quantity of flash illumination light that contributes to proper exposure is changed with complete control not by regulating the quantity of flash light that the electronic flash 17 can provide but by shifting a timing at which the electronic flash 17 is triggered. This flash triggering timing is determined based on subject distances detected by the automatic range finding system including the light windows 14 and 16 and ambient scene brightness detected by the photometric device 18.

Figure 3:
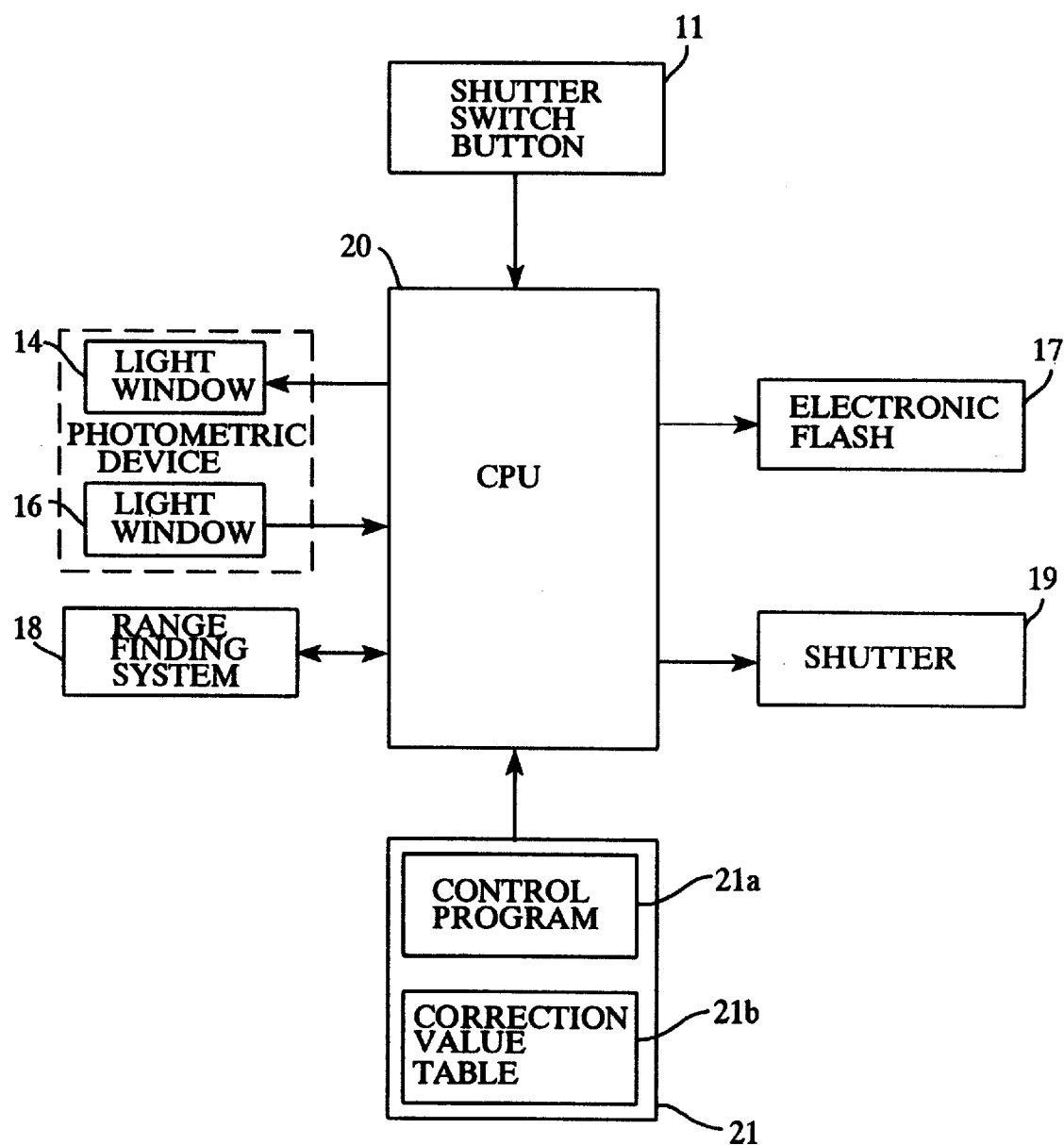
FIG. 3 is a block diagram showing an electronic flash control system.

Referring to FIG. 3, which shows an ever-flash exposure control system for determining flash triggering timing incorporated in the built-in flash camera of the present invention, a center processing unit (CPU) 20, mainly comprising a microcomputer, performs the ever-flash exposure control according to a control program 21a loaded in a read only memory (ROM) 21. A control correction parameter table 21b, which will be described later, is also stored in the read only memory (ROM) 21. The control commences upon an occurrence of a signal which is generated when the shutter release switch 11 is depressed half a stroke to bring the control system into readiness for operation. When receiving a half depression signal, the CPU 20 causes the automatic range finding system and the photometric device 18 to operate so as to find a subject distance and scene brightness, respectively. Signals representative of these subject distance and scene brightness are output to the CPU 20. When subsequently receiving a full depression signal which is generated when the shutter release switch 11 is depressed fully in the stroke, the CPU 20 causes the shutter 19 to open and triggers the electronic flash 17 at a timing after the commencement of shutter opening, which is determined based on the subject distance and scene brightness, to provide illumination light.

Figure 4:
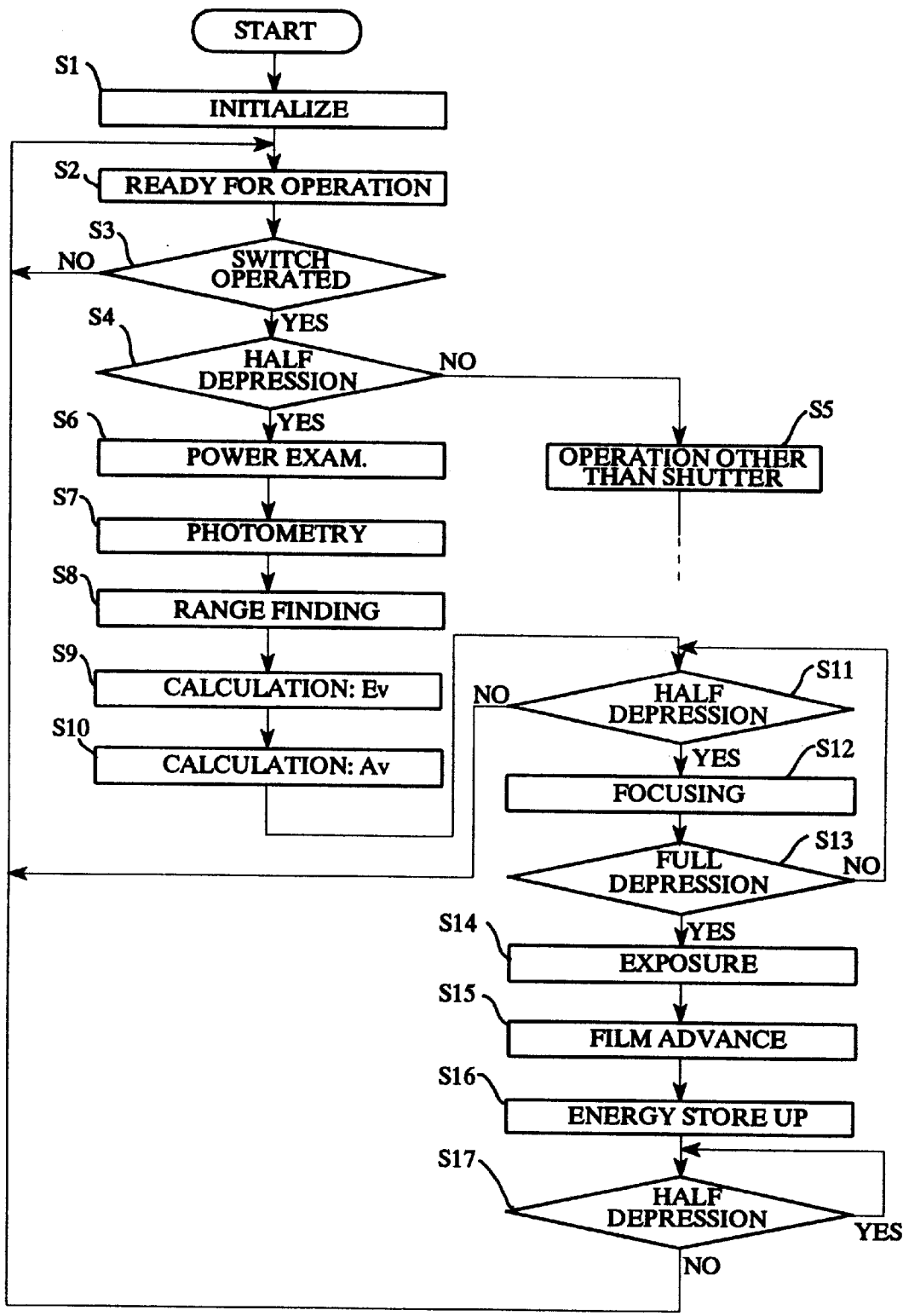
FIG. 4 is a flow chart illustrating an electronic flash triggering control sequence.

The operation of the ever-flash exposure control system depicted in FIG. 3 will be best understood by reviewing FIG. 4, which is a flow chart illustrating a control routine for the microcomputer. Programming a computer is a skill well understood in the art. The following description is written to enable a programmer having ordinary skill in the art to prepare an appropriate program for the computer. The particular details of any such program would of course depend upon the architecture of the particular computers selected.

When the built-in flash camera is powered on, the routine commences and control passes to a function block at step S1 where the CPU 20 clears its memories and initializes various elements such as I/O ports. Then, the CPU 20 stands ready for operation at step S2. At step S3, a decision is made as to whether any one of various switches, including the shutter release switch 11, a self-timer switch, a zooming switch and the like, is operated. This decision is made repeatedly until any one of the manually operated switches is operated, i.e. as long as the answer to the decision is "NO." If the answer to the decision is "YES," another decision is subsequently made at step S4 as to whether there is provided a signal which the shutter release switch 11 generates when depressed halfway. If the shutter release switch 11 is depressed half the stroke, i.e. if the answer to the decision made at step S4 is "YES," then, an examination of the power of the camera batteries is made at step S6. Thereafter, photometric and range finding are subsequently performed at steps S7 and step S8, respectively. But if the decision at step S4 is "NO", then an operation other than shutter operation may be conducted in a step S5.

Based on the measured scene brightness, an exposure value Ev is calculated at step S9 by what is called an additive system of photographic exposure, which is referred as to an APEX system. As well known in the photographic art, an exposure value Ev is expressed by the following equation (I):

$$Ev = Sv + Bv \tag{I}$$

where Sv and Bv are the speed value and the brightness value expressed by the APEX system. In order for the shutter 19 to provide proper exposures, combinations of shutter speeds and aperture sizes are given.

An aperture value Av is subsequently calculated at step S10 in order to determine a timing at which the electronic flash 17 is triggered. As well known, the aperture value Av is defined by an opened area of the shutter 19 at the time the electronic flash 17 is triggered. Accordingly, the flash trigger timing is determined as a time at which the shutter 19 opens to a size having the aperture value Av. In order to calculate the aperture value Av, the apex values Dv and Gv of subject distance and the rated quantity of flash light are given by the following equations (II) and (III), respectively:

$$Dv = -2 \cdot \log_2 \cdot D \tag{II}$$

$$Gv = 2 \cdot \log_2 \cdot G. \tag{III}$$

where D, G are the subject distance and the guide number of the electronic flash 17, respectively.

Further, a flash output correction value look-up table 21b is searched to find a flash output correction value OFS. The flash output correction value look-up table 21b stores data of the flash output correction table 21b shown in FIG. 5 which defines output correction values according to subject distances D and scene brightness B as parameters. In this instance, possible subject distances are divided into four ranges, namely a first distance range from a near distance (NEAR) to a first specific distance D1 (for instance 1.3 m), a second distance range from the first specific distance D1 to a second specific distance D2 (for instance 3 m), a third distance range from the second specific distance D2 to a third specific distance D3 (for instance 8.9 m), and a fourth distance range from the third specific distance D3 to infinity. Similarly, scene brightness are divided into four ranges, such as the a first brightness range from 0 (zero) to first specific brightness B1 (corresponding, for instance, to a brightness value Bv of 3.5), a second brightness range from the brightness B1 to second specific brightness B2 (corresponding, for instance, to a brightness value Bv of 6), a third brightness range from the brightness B2 to third specific brightness B3 (corresponding, for instance, to a brightness value Bv of 6), and the fourth brightness range from the brightness B3 to infinity. For instance, a correction value OFS of ¼ is selected for a subject which is in a scene with scene brightness in the second brightness range (B1–B2) at a subject distance in the first distance range (NEAR–D1). A correction value of 1 (one) is selected for a subject which is in the scene with brightness in the second brightness range (B1–B2) at a subject distance in the fourth distance range (B3–B4). Further, a flash value FL is calculated from the following equation (IV)

$$FL = \log_2 \cdot OFS \qquad (IV)$$

Based on these apex values of Gv, Sv, Dv and FL, the aperture value Av is finally given by the following equation (V):

$$AV = Gv + Sv + Dv - FL - 5 \qquad (V)$$

Thereafter, a decision is made at step S11 as to whether there is still a half depression signal. If the answer to the decision is "NO," this indicates that the operator has removed his or her finger from the shutter release switch 11 and, consequently, the shutter release switch 11 is turned off, then, the sequence returns to step S2 and holds the CPU 20 ready for operation. On the other hand, if the answer to the decision is "YES," then, after causing the taking lens system 12 to focus on the subject at step S12, another decision is made at step S13 as to whether there is provided a full depression signal. If the answer to the decision is "NO," these decision are repeatedly made at steps S11 and S13 until the "YES" answer is provided. If in fact the answer to the decision is "YES," which indicates that the shutter release switch 11 is fully depressed for exposure, then, a flash exposure is made at step S14. Specifically, the shutter 19 opens to an aperture and closes at a time determined according to the exposure value Ev so as to allow the quantity of light to pass therethrough, thereby making proper exposure of a film frame. During this exposure, the electronic flash 17 is triggered at a time the shutter aperture reaches a size determined by the aperture value Av to provide flash illumination light toward the subject. The shutter 19, which is still opened, allows flash illumination light reflected by and from the subject to pass therethrough. In this instance, the quantity of flash illumination light to which the exposure corresponds is proportional to the opened area of the shutter 19 at the time the electronic flash 17 is triggered.

When the shutter 19 closes, the CPU 20 causes a film wind-up mechanism (not shown) to advance the film by one frame at step S15 and a capacitor or condenser of the electronic flash 17 to store up electrical energy supplied by batteries at step S16. Finally, a decision is made at step S17 as to whether there is provided a half depression signal. When the answer to the decision is "NO," the sequence returns to step S2 and holds the CPU 20 ready for operation. This decision is repeatedly made until there is provided the "NO" answer.

As apparent from the flash output correction value table shown in FIG. 5, various correction values OFS are strictly assigned to, for instance, 16 specific ranges of combinations of distances and brightness. For example, assigned to low brightness in the first brightness range (0–B1) is a correction value of 1 (one) which is equivalent to an exposure value Ev of zero (0) and causes no reduction in the quantity of flash illumination light allowed to pass through the shutter 19. Correction values OFS assigned to scene brightness higher than the scene brightness B1 are between ½ and ⅛ which are equivalent to exposure values Ev of −1 and −3. For the exposure values Ev from ½ to ⅛, the quantity of flash illumination light allowed to pass through the shutter 19 is reduced. A reduction in the quantity of flash illumination light is larger for relatively short subject distances than for relatively long subject distances.

FIGS. 6–9 are diagrams showing quantitative proportions of flash illumination light and ambient scene light to which exposure of a film of a type having a film speed of ISO 100 (which is a speed value Sv of 5) corresponds for the first to fourth distance ranges, respectively.

Figure 6:
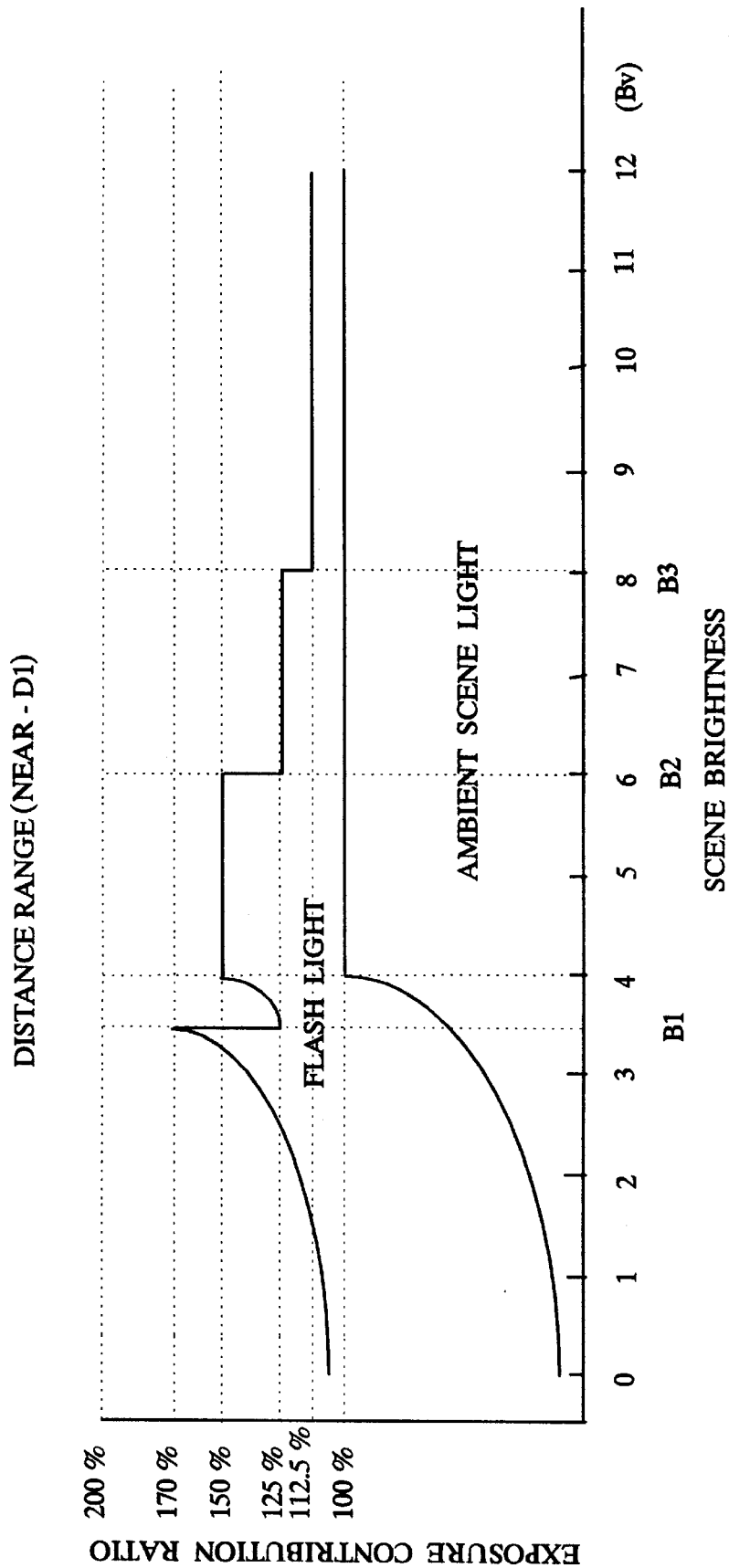
FIG. 6 is a diagram showing quantitative proportions of flash illumination light and ambient scene light contributory to proper exposure for a first range of subject distances from a near distance to a distance D1.

FIG. 6 is a diagram showing quantitative proportions of flash illumination light and ambient scene light to for the first distance range (0–D1). Since an exposure time for which the shutter 19 maintains the aperture is limited to a specific critical time for preventing influence of camera shaking for scene brightness less than the brightness value Bv of 4, the ambient scene light is insufficient in quantity to provide a proportion of 100% for proper exposure. Specifically, the quantitative proportion of ambient scene light contributory to film exposure (which is hereafter referred to as a contribution ratio of ambient scene light) increases with an increase in scene brightness until a scene brightness equivalent to the brightness value Bv of 4. For scene brightness higher than the brightness value Bv of 4, the shutter 19 is controlled to give a combination of exposure time and aperture preferable for the contribution ratio of 100% to proper film exposure. Accordingly, the contribution ratio of ambient scene light to exposure is invariable for brightness values higher than the brightness value Bv of 4.

During the exposure control, the electronic flash 17 is triggered to provide flash illumination light toward the subject. For scene brightness less than the first specific brightness B1, the quantitative proportion of ambient scene light contributory to film exposure (which is hereafter referred to as a contribution ratio) is always 100%. However, with an increase in the scene brightness from one brightness range to an adjacent higher brightness range, the contribution ratio of flash illumination light is reduced to half. This is because the correction values OFS of 1, 2/1, ¼ and ⅛, which are equivalent to 0, 1, 2 and 3 steps under a proper exposure, respectively, are assigned to the first, second, third and fourth brightness ranges, respectively, in the flash output correction value table of FIG. 5.

In such a manner, when a subject is at subject distances less than D1 in the first distance range, as the scene brightness changes from a lower side to a higher side, the contribution ratio of flash illumination light is reduced stepwise. If the contribution ratio of flash illumination light to proper exposure is invariable even for higher scene brightness such as in the prior art ever-flash exposure control, the proportion of light from the background relative to light from the subject becomes small, leading to a picture with a dull background. In the ever-flash exposure control of the present invention, the contribution ratio of flash illumination light is reduced stepwise with changes in scene brightness from the lower brightness ranges to the adjacent higher brightness ranges, there is no change in the proportion of light from the background relative to light from the subject due to an increase in the scene brightness. This provides a balanced distribution of brightness over even a bright scene, resulting in a picture with the background having a natural appearance. That is true to scenes including subjects at the second for fourth distance ranges under the same conditions.

For subjects in the first distance range (NEAR–D1) in scenes whose brightness is higher than the third specific brightness B3, the quantity of flash illumination light effective for film exposure is controlled to be considerably small as apparent from FIG. 6. This is for the purpose of preventing an unbalanced distribution of brightness over the scene to be photographed in such close up shots where a subject fills most of the frame which leads to pictures with the subject standing out in bold relief against a dark background.

Figure 7:
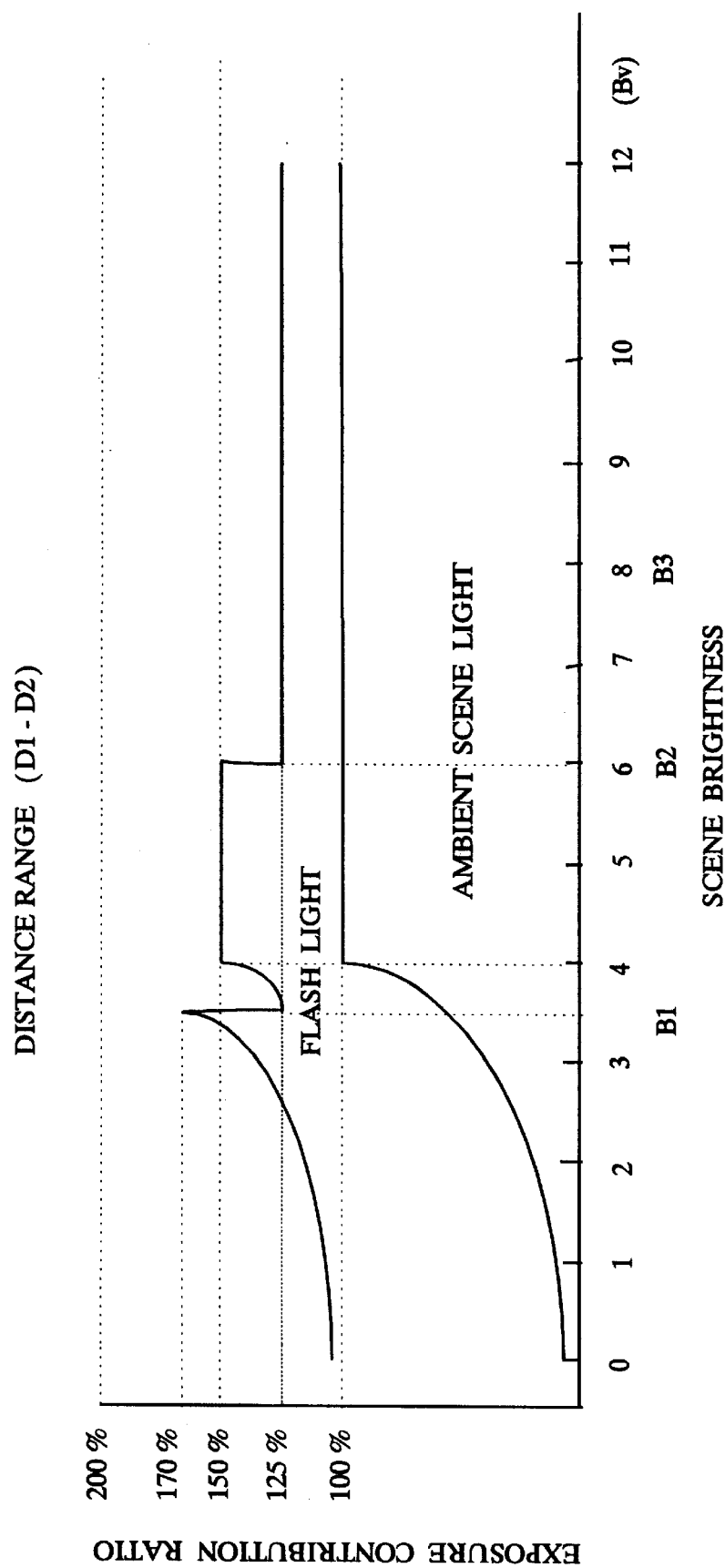
FIG. 7 is a diagram showing quantitative proportions of artificial illumination light and ambient scene light contributory to proper exposure for a second range of subject distances between distances D1 and D2.

FIG. 7 shows quantitative proportions of flash illumination light and ambient scene light contributory to exposure for the second distance range (D1–D2). In the second distance range, the shutter 19 permits the same quantity of ambient scene light for overall scene brightness as in the first distance range (NEAR–D1). During the flash exposure control in the second distance range (D1–D2), while, with an increase in the scene brightness from one brightness range to the adjacent higher brightness range, the contribution ratio of flash illumination light is reduced to half, nevertheless, in the fourth scene brightness range (B3–∞), the contribution ratio of flash illumination light remains the same as in the third scene brightness range (B2–B3). This is because, at the second distance range (D1–D2), there does not occur an unbalanced distribution of brightness between the subject and background even in the fourth brightness range (B3–∞).

Figure 8:
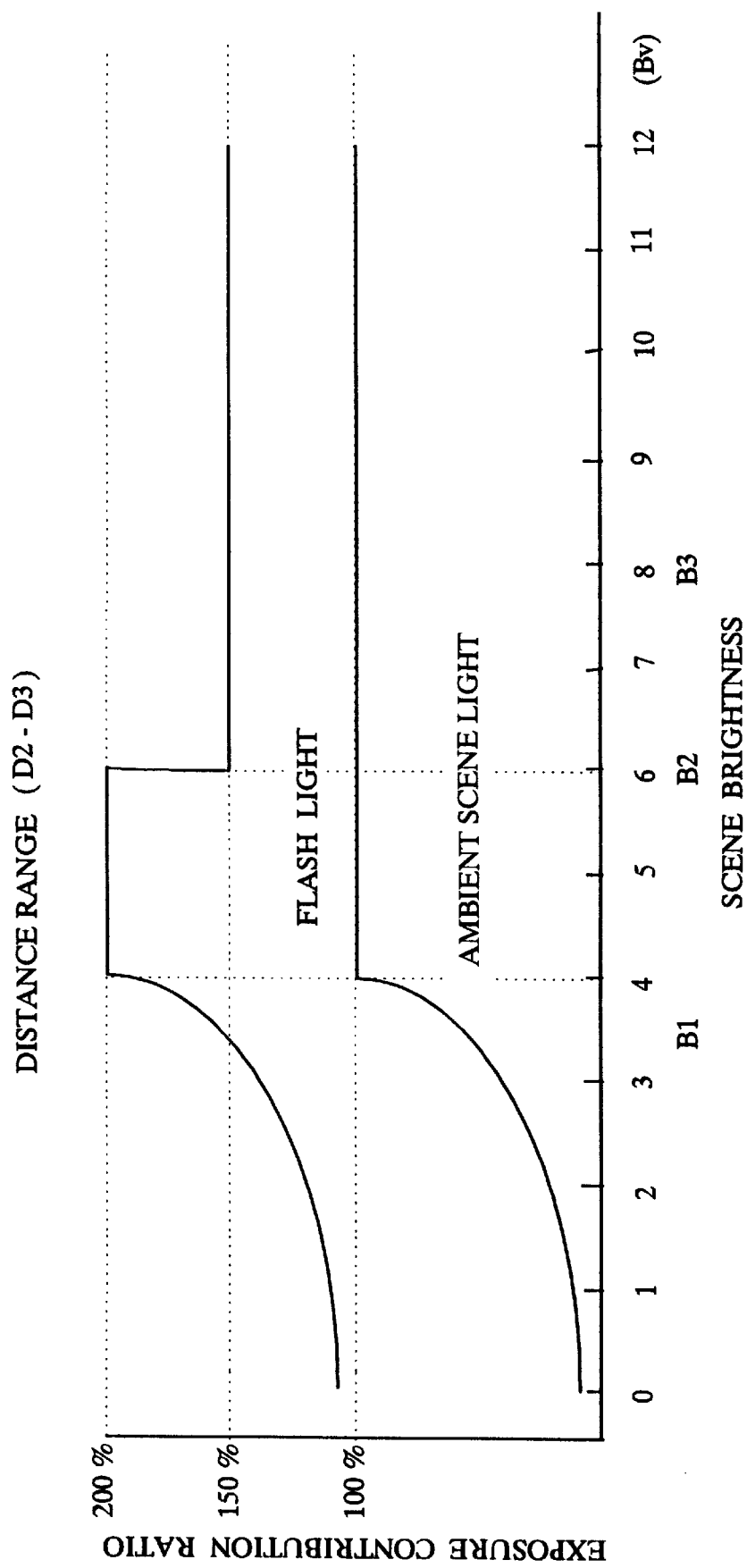
FIG. 8 is a diagram showing quantitative proportions of artificial illumination light and ambient scene light contributory to proper exposure for a third range of subject distances between distances D2 and D3.

FIG. 8 shows quantitative proportions of flash illumination light and ambient scene light for the third distance range (D2–D3). In the third distance range (D2–D3), the contribution ratio of flash illumination light to film exposure is not reduced to half for the second brightness range (B1–B2). In other words, for the third distance range (D2–D3), the contribution ratio of flash illumination light is twice as large as for the second distance range (D1–D2). Nevertheless, because of longer subject distances than the specific distance of D2, there does not occur an unbalanced distribution of brightness between the subject and background.

Figure 9:
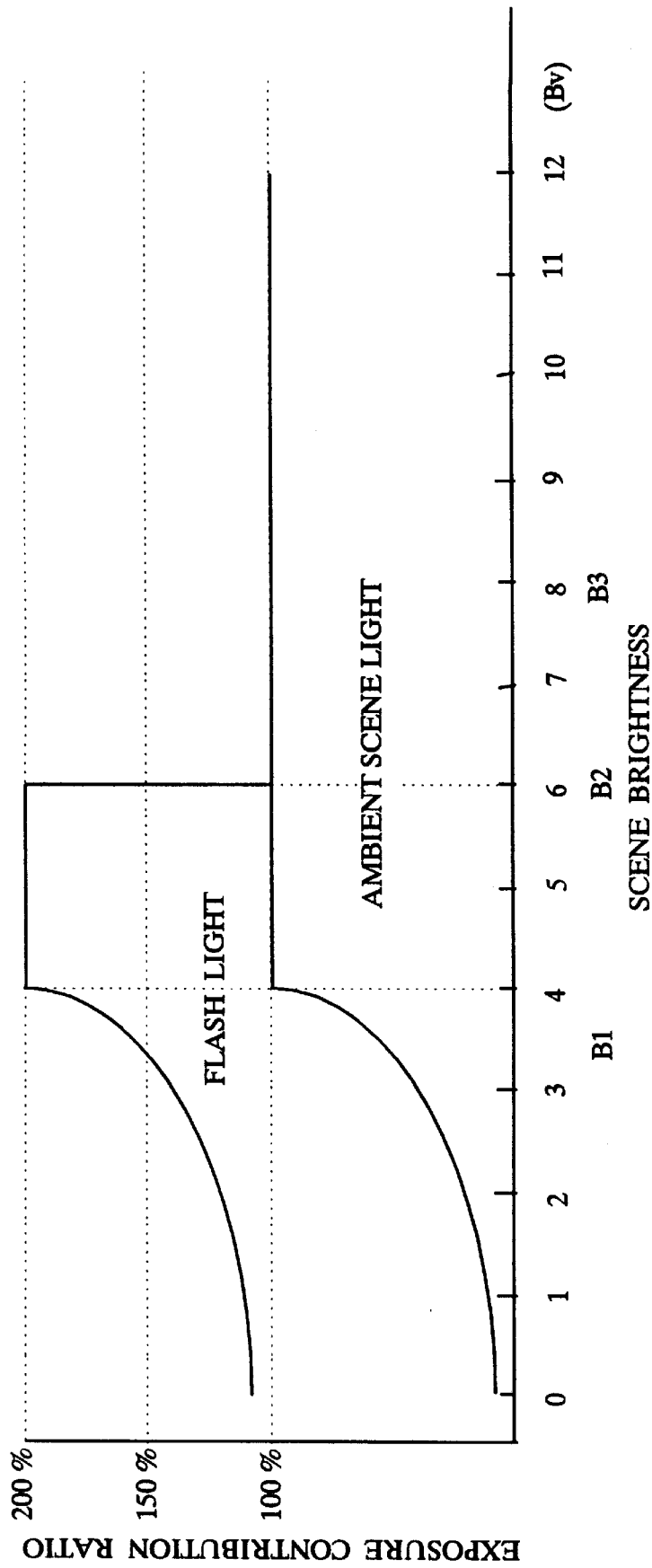
FIG. 9 is a diagram showing quantitative proportions of artificial illumination light and ambient scene light contributory to proper exposure for a fourth range of subject distances longer than the distance D3.
Figure 10:
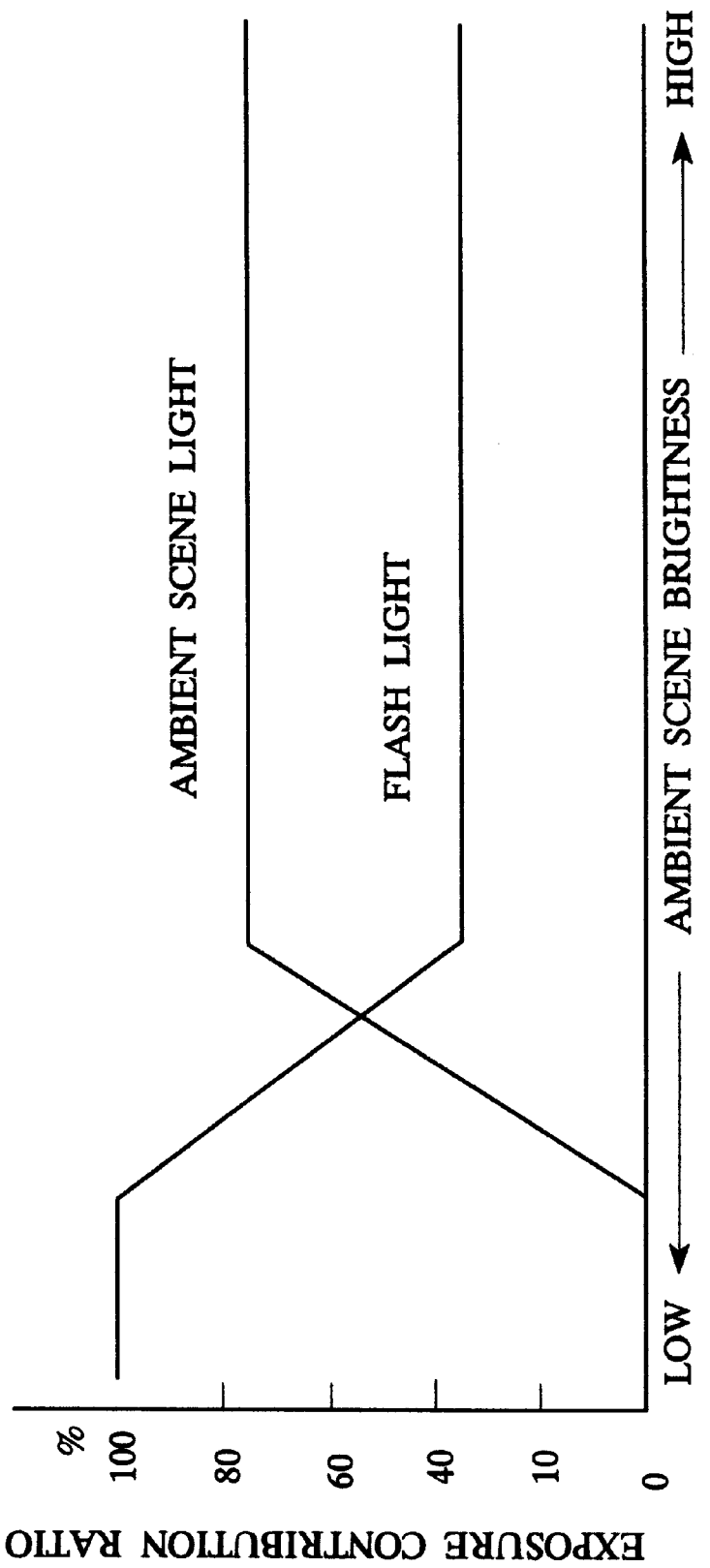
FIG. 10 is a diagram showing quantitative proportions of flash illumination light and ambient scene light contributory to exposure over an entire range of the brightness of ambient scene according to the prior art flash exposure camera.

FIG. 9 shows quantitative proportions of flash illumination light and ambient scene light for the fourth distance range (D3–∞). In the fourth distance range (D3–∞), the contribution ratio of flash illumination light is kept to be 100% for the second brightness range (B1–B2). However, for the third and fourth brightness ranges (B2–B3 and B3–∞), the electronic flash 17 is not triggered so as to render exposure attributable 100% to ambient scene light only. This is because the flash illumination light has no effect on subjects at subject distances longer than the distance of D3 under scene brightness in the third and fourth ranges (B2–B3 and B3–∞).

Although the above embodiment of the present invention has been described with regard to exposure of films having an ISO film speed of 100, the ever-flash exposure control may be used for any type of films only by varying brightness values Bv in the control correction value table 21b according to film speeds.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A built-in flash camera equipped with an ever-flash exposure control system comprising:

a brightness detector capable of measuring a level of brightness of a scene to be photographed;

a distance detector capable of determining a camera-to-subject distance;

a shutter which, for each photographic exposure, is capable of moving from a closed position to a fully open position, maintaining the fully open position for a predetermined period of time, and moving back to the closed position;

an electronic flash;

a memory containing a flash output correction value associated with each of a plurality of combinations of said scene brightness level and said camera-to-subject distance, said flash output correction values being established so that a proportional amount of light provided by the electronic flash in relation to said scene brightness level decreases as a function of increasing scene brightness level; and a controller capable of retrieving the flash output correction value associated with the camera-to-subject distance and the scene brightness level from the memory and using the flash output correction value to determine the preselected time for triggering the electronic flash;

wherein the electronic flash is triggered at a preselected time while the shutter is one of partially open and fully open, wherein a degree of illumination provided by the electronic flash is maximized by triggering the electronic flash while the shutter is fully open, and wherein the degree of illumination provided by the electronic flash is progressively decreased by triggering the flash earlier during the shutter's movement from the closed position to the fully open position.

2. The built-in flash camera of claim 1, wherein the memory comprises flash output correction values based on combinations of predetermined ranges of said scene brightness level and said camera-to-subject distance.

3. The built-in flash camera of claim 2, wherein there are at least four said ranges of scene brightness level.

4. The built-in flash camera of claim 3, wherein there are at least four said ranges of camera-to-subject distance.

5. The built-in flash camera of claim 4, wherein within at least one of the camera-to-subject distance ranges, at least two adjacent ranges of said scene brightness level have an identical flash output correction value associated therewith.

6. The built-in flash camera of claim 5, wherein within at least the camera-to-subject distance range encompassing infinity, at least one of the ranges of scene brightness level has a flash output correction value associated therewith which causes the controller not to trigger the electronic flash.

* * * * *